(12) United States Patent
Lee

(10) Patent No.: US 9,277,162 B2
(45) Date of Patent: Mar. 1, 2016

(54) KEYSTONE CORRECTION METHOD AND APPARATUS OF CURVED DISPLAY

(71) Applicant: Hyundai Motor Company, Seoul (KR)

(72) Inventor: Jong Bok Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 117 days.

(21) Appl. No.: 14/142,868

(22) Filed: Dec. 29, 2013

(65) Prior Publication Data

US 2015/0092114 A1 Apr. 2, 2015

(30) Foreign Application Priority Data

Sep. 27, 2013 (KR) ........................ 10-2013-0115193

(51) Int. Cl.
*G03B 21/14* (2006.01)
*H04N 5/74* (2006.01)
*H04N 9/31* (2006.01)

(52) U.S. Cl.
CPC ........... *H04N 5/7408* (2013.01); *H04N 9/3147* (2013.01); *H04N 9/3185* (2013.01)

(58) Field of Classification Search
CPC ......... G03B 21/00; H04N 5/74; H04N 5/232; H04N 9/3147; H04N 9/3185; H04N 9/3194; H04N 9/3197

USPC .......................... 353/30, 69, 70; 348/743–747
See application file for complete search history.

(56) References Cited

U.S. PATENT DOCUMENTS

| 8,406,562 B2 * | 3/2013 | Bassi et al. ..................... 382/275 |
| 2004/0061838 A1 * | 4/2004 | Mochizuki ............... H04N 5/74 353/69 |
| 2004/0165154 A1 * | 8/2004 | Kobori et al. ................... 353/69 |
| 2005/0068506 A1 * | 3/2005 | Moriwaki ............. G02B 7/005 353/101 |
| 2012/0075466 A1 * | 3/2012 | Budnick ....................... 348/143 |

FOREIGN PATENT DOCUMENTS

| JP | 2007067495 A | 3/2007 |
| KR | 10-2005-0090442 A | 9/2005 |
| KR | 10-2010-0100058 A | 9/2010 |
| KR | 10-1273534 | 6/2013 |

* cited by examiner

*Primary Examiner* — Sultan Chowdhury
(74) *Attorney, Agent, or Firm* — Mintz Levin Cohn Ferris Glovsky and Popeo, P.C.; Peter F. Corless

(57) ABSTRACT

A keystone correction apparatus and method of curved display are provided. The apparatus includes a curved screen that displays an image and a projector that has an infrared lighting device to irradiate infrared light to the curved screen. An infrared imaging device is configured to capture infrared light reflected from the curved screen. A controller is configured to determine whether the curved screen is distorted using an infrared image captured by the infrared imaging device and perform a keystone correction.

9 Claims, 8 Drawing Sheets

KEYSTONE CORRECTION METHOD AND APPARATUS OF CURVED DISPLAY

CROSS-REFERENCE TO RELATED APPLICATION

This application claims priority to and the benefit of Korean Patent Application No. 10-2013-0115193 filed in the Korean Intellectual Property Office on Sep. 27, 2013, the entire contents of which are incorporated herein by reference.

BACKGROUND (a) Field of the Invention

The present invention relates to a keystone correction method and apparatus of a curved display. More particularly, the present invention relates to keystone correction method and apparatus of a curved display that determines distortion of a curved screen and corrects keystone error generated by distortion of a curved screen.

(b) Description of the Related Art

Since a function of a vehicle varies, various input devices have been developed for inputting commands of the various functions. Recently, a touch screen device has been applied to a cluster or audio video navigation (AVN) of a vehicle. Generally, since a touch screen disposed within a vehicle is mounted at a front side of driver's seat, efficiency of actual storage space is decreased. In addition, a curved display is disposed within the vehicle to correspond to a curved line design of the mounting area within the vehicle.

As shown in FIG. 1, in a curved display apparatus, a light is irradiated to a curved screen 10 disposed at frontal portion 1 of a vehicle and an image is projected onto the curved screen 10. The curved screen 10 includes an acryl plate and rear side projection film bonded to the acryl plate. To install the curved screen 10 to the frontal portion 1 of a vehicle, a bezel 3 is fixed to the frontal portion 1 of the vehicle by inserting an outer edge of the curved screen 10 into the bezel 3.

According to the curved display of the related art, the curved screen 10 is deformed by an increase of temperature within the vehicle and the image projected onto the curved screen 10 is distorted. In addition, the curved screen 10 is separated from the bezel 3 by vibration or impact continuously generated in the vehicle and thus the curved screen 10 is not maintained at an initial position, further distorting the image projected onto the curved screen 10. Therefore, since the image projected onto the curved screen 10 is distorted, the image projected onto the curved screen 10 may deteriorate.

The above information disclosed in this section is merely for enhancement of understanding of the background of the invention and therefore it may contain information that does not form the prior art that is already known in this country to a person of ordinary skill in the art.

SUMMARY

The present invention provides a method and apparatus that correct distortion of an image projected onto a curved screen by deformation or separation of a curved screen. In addition, the distortion is prevented by correction of an image projected onto a curved screen to improve the image projected onto a curved screen.

A keystone correction apparatus of curved display according to an exemplary embodiment of the present invention may include: a curved screen configured to display an image; a projector having an infrared lighting device that irradiates infrared light to the curved screen; an infrared imaging device configured to capture infrared light reflected from the curved screen; and a controller configured to determine whether the curved screen is distorted using an infrared image captured by the infrared imaging device and performing a keystone correction.

Further, the projector may irradiate infrared light greater than a size of the curved screen and the controller may be configured to compare an exterior circumference image of the curved screen captured by the infrared imaging device with a reference image to determine whether the curved screen is distorted. An infrared absorbing adhesive formed in a predetermined shape may be further provided on exterior circumference of the curved screen. In addition, the controller may be configured to compare an infrared image formed by the infrared absorbing adhesive with a reference image to determine whether the curved screen is distorted.

BRIEF DESCRIPTION OF THE DRAWINGS

The drawings are provided for reference in describing exemplary embodiments of the present invention and the spirit of the present invention should not be construed only by the accompanying drawings.

DESCRIPTION OF SYMBOLS

Figure 1:
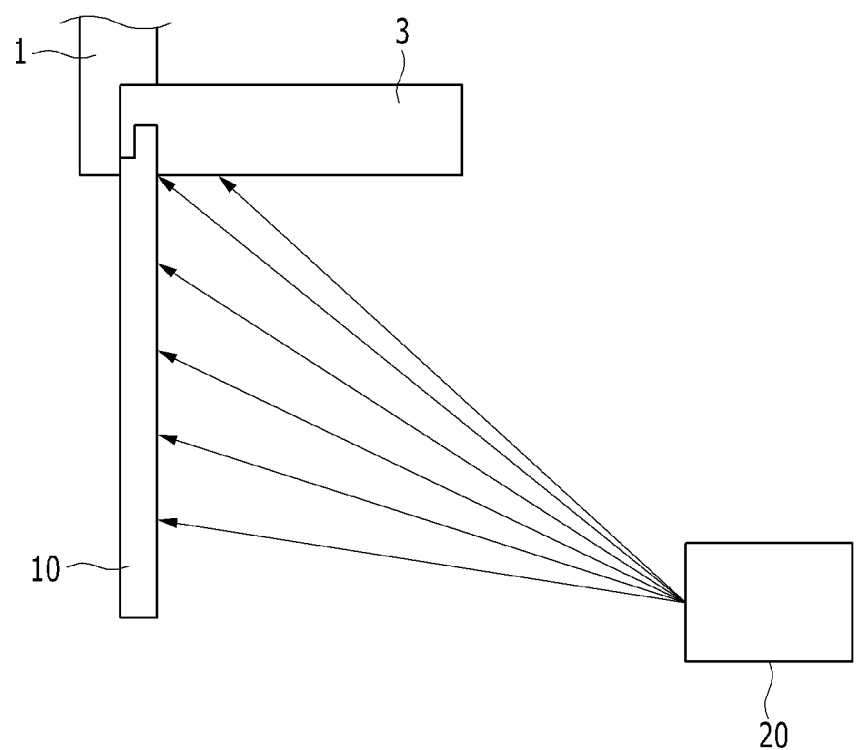
FIG. 1 is an exemplary curved display apparatus within a vehicle according to the related art.
Figure 2:
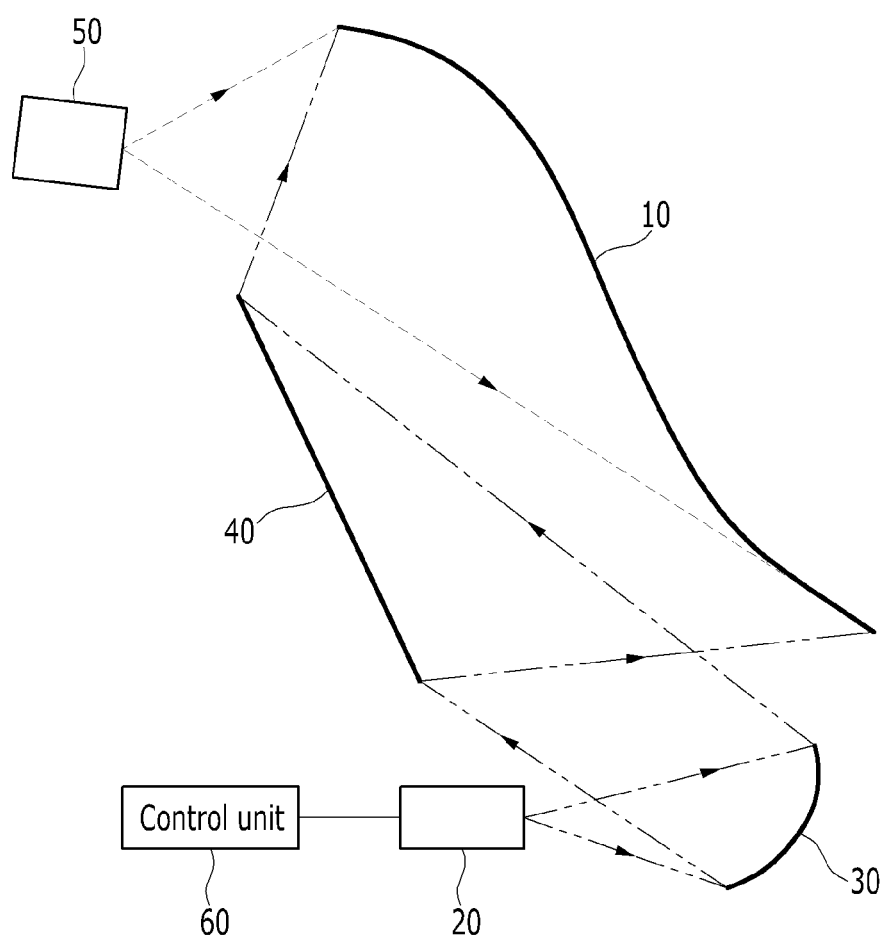
FIG. 2 shows an exemplary keystone correction apparatus of a curved display according to an exemplary embodiment of the present invention.

| 10: curved screen | 20: projector |
|---|---|
| 30: aspherical mirror | 40: reflection mirror |
| 50: infrared imaging device | 60: controller |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. To clearly describe the present invention, portions that are not connected with the description will be omitted. Like reference numerals designate like elements throughout the specification. In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

FIG. 1 is an exemplary curved display apparatus within a vehicle according to the related art. As shown in FIG. 1, a curved display apparatus may include a curved screen 10 configured to display an image, a projector 20 disposed within the curved screen 10 and configured to project an image onto the curved screen 10, an aspherical minor 30 configured to reflect the image projected from the projector 20, and a reflection mirror 40 configured to project the image reflected from the aspherical mirror 30 to the curved screen 10.

A light source (not shown) may be configured to irradiate an image provided by the projector 20. The image irradiated by the light source may be projected onto the curved screen 10 via an optical module within the projector 20. In addition, the aspherical minor 30 may be disposed between the projector 20 and the curved screen 10. In other words, the light projected from the projector 20 may be reflected by the aspherical minor 30 and the reflected light may be irradiated to the reflection minor 40. The reflected light from the reflection mirror 40 may be projected onto the curved screen 10 and to display the projected image to user.

To determine a distortion of the curved screen 10, as shown in FIG. 1, the curved display apparatus may include a curved screen 10 configured to display an image, a projector 20 including an infrared lighting device configured to irradiate infrared to the curved screen, an infrared imaging device 50 (e.g., a camera, a video camera, and the like) may be configured to capture infrared reflected from the curved screen 10, and controller 60 may be configured to determine whether the curved screen 10 is distorted using an infrared image captured by the infrared imaging device 50 and perform a keystone correction.

The infrared light generated at the infrared lighting device may be projected onto the curved screen 10 via the projector 20. In particular, the infrared light generated at the infrared lighting device may be reflected from the aspherical mirror 30 and projected to the reflection minor 40. The infrared light reflected from the reflection mirror 40 may be projected onto the curved screen 10. In addition, the infrared imaging device 50 may be configured to capture the infrared light reflected from the reflection minor 40. The controller 60 may be configured to determine whether the curved screen 10 is distorted and determine an amount of the distortion of the curved screen 10.

Figure 3A:
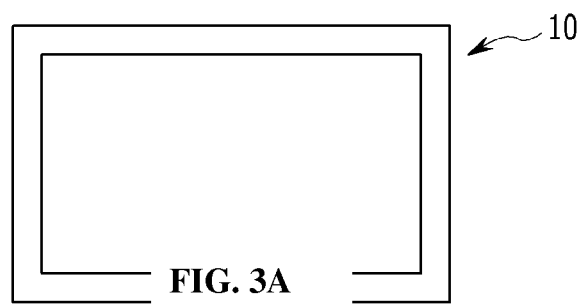
FIGS. 3A-3C shows an exemplary infrared image used to determine distortion of a curved screen according to an exemplary embodiment of the present invention.
Figure 3B:
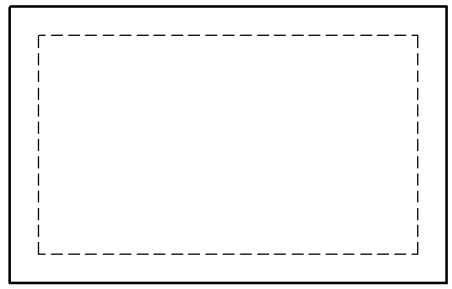
Figure 3C:
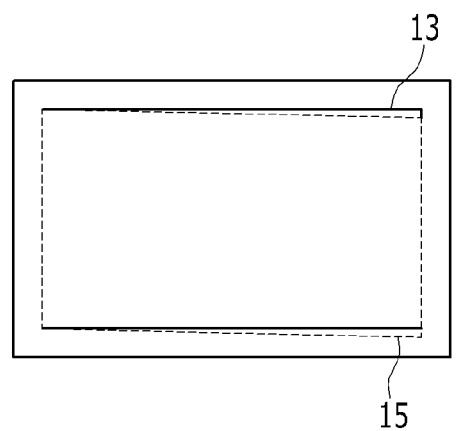

Hereinafter, an exemplary embodiment that determines the distortion and the amount of the distortion of the curved screen 10 will be described in detail. FIGS. 3A-3C conceptually shows an exemplary infrared image used to determine distortion of a curved screen according to an exemplary embodiment of the present invention.

As shown in FIG. 3A, the infrared light projected onto rear side of the curved screen 10 may be greater than a size of the curved screen 10. In particular, the infrared light projected onto overscan area of the curved screen 10 may not be reflected, and the infrared light projected onto the curved screen 10 may be reflected. The overscan area may be the area that is beyond the size of the curved screen 10 and may therefore not be reflected. Therefore, an exterior circumference image (referring to dotted line of FIG. 3A) may be captured. Furthermore, the controller 60 may be configured to compare the exterior circumference image of the curved screen 10 with a reference image and determine whether the curved screen 10 is distorted and an amount of distortion.

As shown in FIG. 3B, when the curved screen 10 is not distorted, the exterior circumference image 15 (referring to dotted line of FIG. 3B) may be substantially consistent with the reference image 13 (referring to solid line of FIG. 3B). Accordingly, the controller 60 may be configured to determine that the curved screen 10 is not distorted.

As shown in FIG. 3C, when the curved screen 10 is distorted, the exterior circumference image 15 (referring to dotted line of FIG. 3C) may not be consistent with the reference image 13 (referring to solid line of FIG. 3C). Therefore, the controller 60 may be configured to compare the exterior circumference image 15 with the reference image 13 and determine whether the curved screen 10 is distorted and an amount of distortion of the curved screen 10. Additionally, the controller 60 may be configured to correct the image projected onto the curved screen 10 by operating an optical module (not shown) indisposed within the projector 20 based on the amount of distortion of the curved screen 10.

Figure 4A:
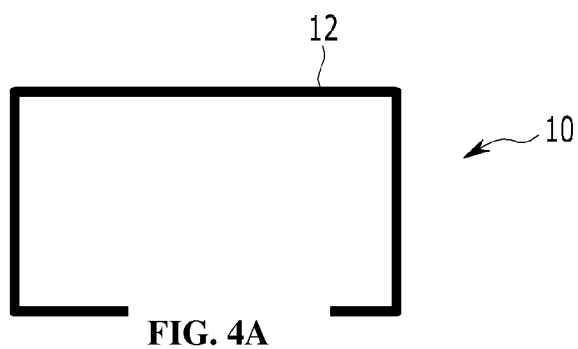
FIGS. 4A-4C shows an exemplary infrared image used to determine distortion of a curved screen according to another exemplary embodiment of the present invention.
Figure 4B:
Figure 4C:

Moreover, another exemplary embodiment that may determine whether the curved screen is distorted and an amount of distortion of the curved screen 10 will be described in detail. FIGS. 4A-4C shows an exemplary infrared image used to determine distortion of a curved screen according to another exemplary embodiment of the present invention.

As shown in FIG. 4A, an infrared absorbing adhesive 12 formed in a predetermined shape may be disposed on an exterior circumference of the curved screen 10. According to an exemplary embodiment of the present invention, the infrared absorbing adhesive 12 may be formed as a rectangle shape based on an exterior circumference of the curved screen 10. In addition, the infrared light projected onto a rear side of the curved screen 10 may be greater than a size of the curved screen 10. Therefore, the infrared light projected onto the infrared absorbing adhesive 12 may not be reflected and the infrared light projected onto the curved screen 10 may be reflected. In other words, the exterior circumference image of the curved screen 10 may be captured by the infrared absorbing adhesive 12 disposed on the curved screen 10.

As shown in FIG. 4B, when the curved screen 10 may not be distorted, the exterior circumference image 17 by the infrared absorbing adhesive 12 may be substantially consistent with a predetermined exterior circumference image. As shown in FIG. 4C, when the curved screen 10 is distorted, the exterior circumference image 17 by the infrared absorbing adhesive 12 may not be consistent with a predetermined exterior circumference image.

Accordingly, the controller 60 may be configured to compare the exterior circumference image 17 by the infrared absorbing adhesive 12 with the predetermined exterior circumference image and determine whether the curved screen 10 is distorted and an amount of distortion of the curved screen 10. In addition, the controller 60 may be configured to correct the image projected onto the curved screen 10 by operating an optical module (not shown) disposed within the projector 20 based on amount of distortion of the curved screen 10.

As described above, with the keystone correction apparatus of curved display according to an exemplary embodiment of the present invention, it may be possible to determine whether the curved screen is distorted and an amount of distortion of the curved screen using infrared image reflected from the curved screen. Additionally, keystone correction may be performed using the amount of distortion of curved screen, thus improve the definition of an image projected onto the curved screen.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A keystone correction apparatus of a curved display, comprising:
   a curved screen configured to display an image;
   a projector that includes an infrared lighting device configured to irradiate infrared light to the curved screen;
   an infrared imaging device configured to capture infrared light reflected from the curved screen; and
   a controller configured to determine whether the curved screen is distorted using an infrared image captured by the infrared imaging device and perform a keystone correction,
   wherein the projector irradiates infrared light greater than a size of the curved screen, and the controller is configured to compare an exterior circumference image of the curved screen captured by the infrared imaging device with a reference image and determine whether the curved screen is distorted.

2. The keystone correction apparatus of curved display of claim 1, wherein an infrared absorbing adhesive formed in a predetermined shape is disposed on an exterior circumference of the curved screen.

3. The keystone correction apparatus of curved display of claim 2, wherein the controller is configured to compare an infrared image formed by the infrared absorbing adhesive with a reference image and determine whether the curved screen is distorted.

4. A keystone correction method of a curved display, comprising:
   receiving, by a controller, an infrared image captured by an infrared imaging device, wherein the infrared image is captured from infrared light reflected from a curved screen and projected onto the curved screen by a projector;
   determining, by the controller, whether the curved screen is distorted using the captured infrared image; and
   performing, by the controller, a keystone correction when the curved screen is distorted,
   wherein the determining of whether the curved screen is distorted comprises
   comparing, by the controller, an exterior circumference image of the curved screen captured by the infrared imaging device with a reference image when the projector irradiates infrared light greater than a size of the curved screen, and
   determining, by the controller, whether the curved screen is distorted.

5. The keystone correction method of claim 4, wherein an infrared absorbing adhesive formed in a predetermined shape is disposed on an exterior circumference of the curved screen.

6. The keystone correction method of claim 5, further comprising:
   comparing, by the controller, an infrared image formed by the infrared absorbing adhesive with a reference image and determine whether the curved screen is distorted.

7. A non-transitory computer readable medium containing program instructions executed by a controller, the computer readable medium comprising:
   program instructions that receive an infrared image captured by an infrared imaging device, wherein the infrared image is captured from infrared light reflected from a curved screen and projected onto the curved screen by a projector;
   program instructions that determine whether the curved screen is distorted using the captured infrared image; and
   program instructions that perform a keystone correction when the curved screen is distorted,
   wherein the program instructions that determine whether the curved screen is distorted comprises
   program instructions that compare an exterior circumference image of the curved screen captured by the infrared imaging device with a reference image when the projector irradiates infrared light greater than a size of the curved screen; and
   program instructions that determine whether the curved screen is distorted.

8. The non-transitory computer readable medium of claim 7, wherein an infrared absorbing adhesive formed in a predetermined shape is disposed on an exterior circumference of the curved screen.

9. The non-transitory computer readable medium of claim 8, further comprising:
   program instructions that compare an infrared image formed by the infrared absorbing adhesive with a reference image and determine whether the curved screen is distorted.

* * * * *